United States Patent
Akashi et al.

(10) Patent No.: US 6,925,222 B2
(45) Date of Patent: Aug. 2, 2005

(54) PHOTONIC SWITCH (75) Inventors: Tamotsu Akashi, Kawasaki (JP); Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 10/265,137

(22) Filed: Oct. 7, 2002

(65) Prior Publication Data

US 2003/0185493 A1 Oct. 2, 2003

(30) Foreign Application Priority Data

Mar. 29, 2002 (JP) ........................................ 2002-095233

(51) Int. Cl.⁷ .............................................. G02B 6/35
(52) U.S. Cl. .......................................... 385/18; 385/17
(58) Field of Search ............................. 385/14–24, 140

(56) References Cited

U.S. PATENT DOCUMENTS 6,317,530 B1 * 11/2001 Ford ............................ 385/17
6,473,544 B1 * 10/2002 Daneman et al. ............. 385/17
6,697,547 B2 * 2/2004 Walter et al. ................ 385/16
2002/0164109 A1 * 11/2002 Oikawa et al. ............... 385/17
2002/0172451 A1 * 11/2002 Gupta et al. ................. 385/16

* cited by examiner

Primary Examiner—Akm Enayet Ullah
Assistant Examiner—Kevin S. Wood
(74) Attorney, Agent, or Firm—Staas & Halsey LLP

(57) ABSTRACT

Disclosed is a photonic switch that includes a plurality of optical-path switching means having movable light reflecting portions that guide light from each of a plurality of input ports to any output port among a plurality of output ports. Each of the optical-path switching means is made to produce a specific loss so as to reduce path-to-path variations in loss along the paths from the input to the output ports. Specifically, loss along a path is the total of loss based upon optical path length and loss produced by the optical-path switching means. A specific loss is produced by each of the optical-path switching means in such a manner that total loss is equalized from path to path.

3 Claims, 7 Drawing Sheets

PHOTONIC SWITCH

BACKGROUND OF THE INVENTION

This invention relates to a photonic switch used in an optical communication system and, more particularly, to a photonic switch that uses a micro mirror manufactured utilizing micro machine technology.

Figure 10:
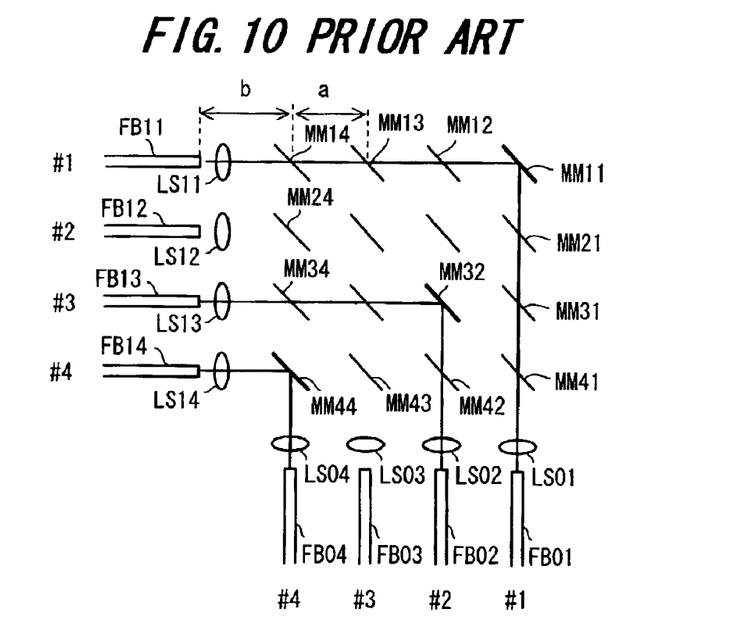
FIG. 10 is a diagram showing the structure of a 4-channel photonic switch according to the prior art.

The increase in the speed and capacity of optical networks has been accompanied by demand for photonic switches that are capable of switching a circuit path using an optical signal as is without converting it to an electrical signal. Though a wide variety of such switches are in use and depend upon the number of switched channels, a two-dimensional photonic switch that uses MEMS (Micro-Electro Mechanical Systems) technology is considered to be well-suited for an intermediate number of channels on the order of 4 to 32 channels. FIG. 10 illustrates the structure of a 4-channel photonic switch serving as an example of a two-dimensional MEMS photonic switch. The photonic switch comprises optical fibers FB11 to FB14 of input ports (input channels) #1 to #4, lenses LS11 to LS14, optical fibers FB01 to FB04 of output ports (output channels) #1 to #4, lenses LS01 to LS04 and a plurality of micro MEMS mirrors MM11 to MM44 fabricated on a silicon substrate by a semiconductor manufacturing technique.

Light that has propagated through the fibers FB11 to FB14 is converted by the lenses LS11 to LS14 to collimated light suitable for transmission through space. The MEMS mirrors MM11 to MM44 can be erected by the action of static electricity. The photonic switch is such that erecting specific mirrors causes light that has propagated through the fibers FB11 to FB14 to be reflected, thereby enabling the optical paths to be switched to the positions of desired fibers on the output side. The bold lines in FIG. 10 indicate MEMS mirrors that have been erected, while the fine lines indicate MEMS mirror that are in a reclining attitude. Accordingly, in FIG. 10, MEMS mirrors MM1, MM32 and MM44 are upright and, as a result, optical signals from input channels #1, #3 and #4 have been cross-connected to output channels #1, #2 and #4, respectively.

Figure 11:
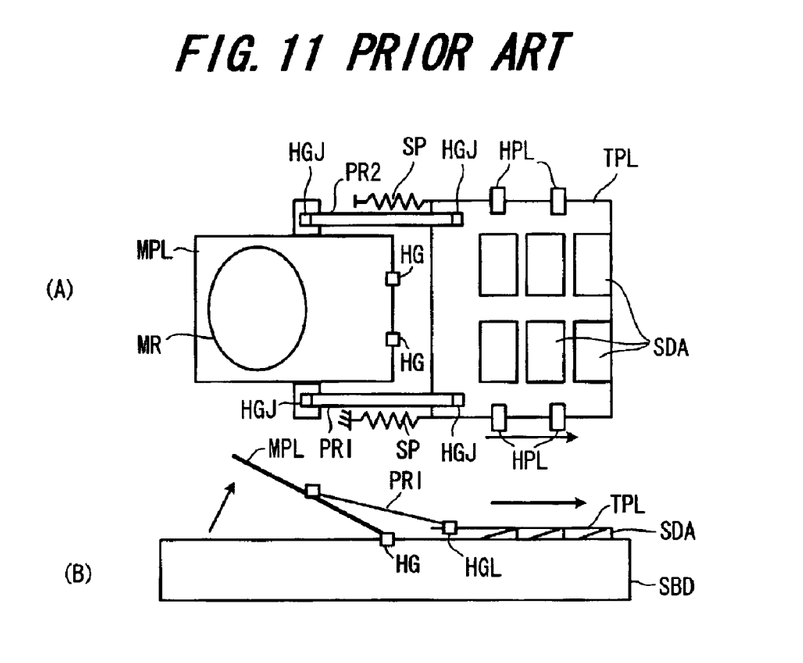
FIG. 11 is a schematic view useful in describing an operation for erecting a MEMS mirror.

FIG. 11 is a schematic view useful in describing the erection of a MEMS mirror, in which (A) is a plan view and (B) a side view. A mirror plate MPL on which a circular switching mirror MR has been formed is rotatably mounted on a silicon substrate SBD by a hinge HG. A translation plate TPL is translated to the left and right by a scratch drive actuator SDA and is connected to the mirror plate MPL by push rods PR1, PR2 via hinge joints HGJ. The mechanism further includes springs SP and holding plates HPL. If a voltage of ±100 V is applied to the scratch drive actuator SDA at a frequency of 500 kHz, the translation plate TPL will move rightward, enabling the mirror plate MPL to be erected to an angle of 90° in 0.5 ms. If drive is removed, the translation plate TPL is moved leftward by the springs SP, whereby the plate can be reclined instantaneously.

It should be obvious from FIG. 10 that the optical path lengths of this two-dimensional MEMS photonic switch differ depending upon the path through the switch. In the case of FIG. 10, the optical path of longest length is the path that extends from input channel #1 to output channel #1 and has a length of 2b+6a. The optical path of shortest length is the path that extends from input channel #4 to output channel #4 and has a length of 2b. Here b represents the distance from the leading end of the fiber to the MEMS mirror, and a represents the distance between mutually adjacent MEMS mirrors. This difference in optical path length gives rise to a variation in loss from path to path.

Figure 12:
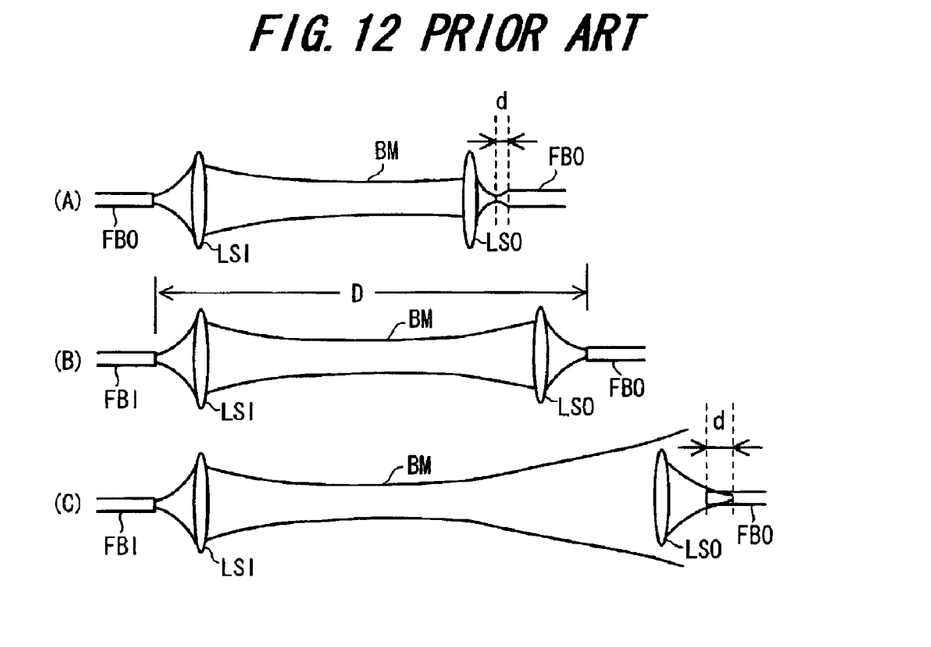
FIG. 12 is a diagram useful in describing loss ascribable to a difference in optical path length.

FIG. 12 is a diagram useful in describing loss ascribable to a difference in optical path length. Assume that an optical system, namely the focal lengths of lenses LSI, LSO and the distances between fibers FBI, FBO and the lenses LSI, LSO, respectively, has been designed so as to minimize loss over an optical path length D, as shown in (B) of FIG. 12. If the length of the optical path becomes shorter than D, as shown in (A) of FIG. 12, a light beam BM enters the lens LS0 in a form narrower than in the case of (B). As a result, the light beam is narrowed down to the maximum extent at a position a distance d in front of the fiber FB0 and then enters the fiber FB0 while its diameter increases. If the beam diameter when the beam enters the fiber FB0 is greater than the inner diameter of the fiber FB0, loss occurs. On the other hand, even if the beam diameter is smaller than the inner diameter of the fiber FB0, narrowing down the beam too much when it enters the fiber will cause loss because the beam will not be guided through the fiber appropriately. Further, if the length of the optical path becomes greater than D, as shown in (C) of FIG. 12, the beam BM will spread too much at the position of the lens LS0 and loss will be the result. In addition, since the beam is narrowed down to the maximum extent at a position d rearward of the fiber end, not all of the light from the lens LS0 enters the fiber FB0 and, hence, loss is produced.

Figure 13:
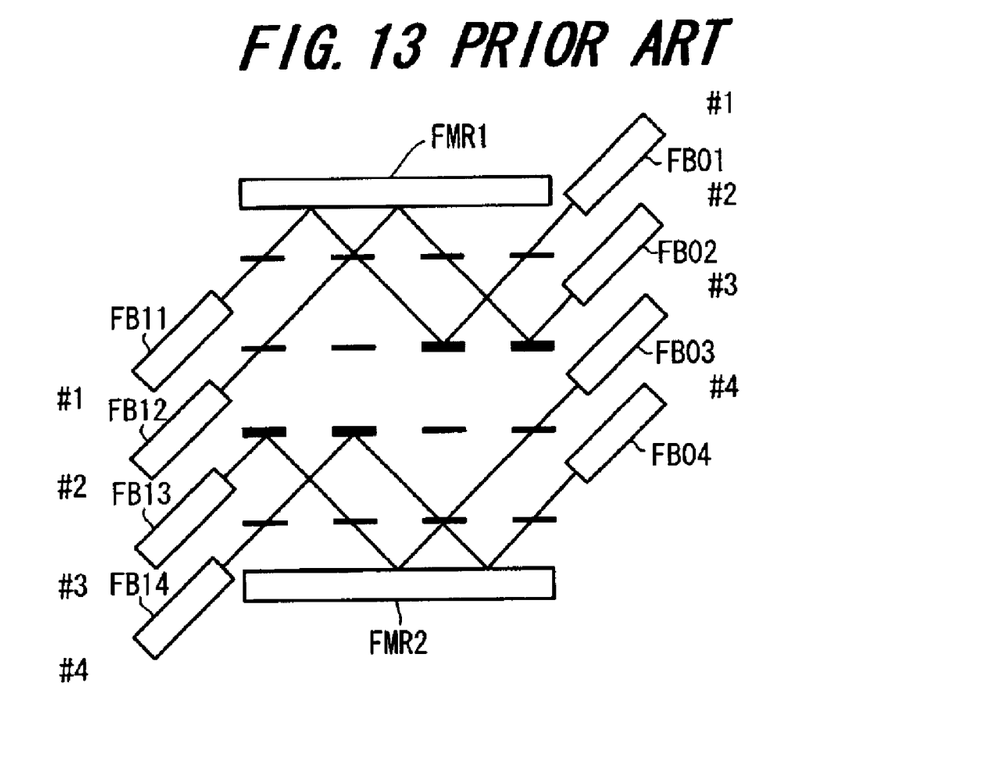
FIG. 13 is a diagram showing the structure of a conventional photonic switch in which optical path lengths are rendered uniform.

Variation in loss in photonic switches is a problem in terms of system application and therefore methods of reducing such variation in loss are being studied. Since a variation in loss essentially is caused by path dependency of the optical path length, a conventional method disclosed in the specification of Japanese Patent Application Laid-Open No. H13-59089 seeks to reduce variations in loss by making optical path length uniform. FIG. 13 is a diagram showing the structure of a photonic switch according to the prior art, in which components identical with those of the photonic switch shown in FIG. 10 are designated by like reference characters. This switch differs in that (1) fixed mirrors FMR1, FMR2 are provided in addition to the MEMS mirrors and the optical path lengths between channels are rendered uniform by using the fixed mirrors to reflect light; (2) the optical fibers are disposed at oblique angles; and (3) the MEMS mirrors that are erected in accordance with the path differ from those erected in FIG. 10. The bold lines in FIG. 10 indicate MEMS mirrors that have been erected, while the fine lines indicate MEMS mirrors that are in a reclining attitude. The bold lines in FIG. 13 indicate MEMS mirrors that have been erected, while the fine lines indicate MEMS mirrors that are in a reclining attitude. Four paths, namely #1→#1, #2→#2, #3→#3 and #4→#4, are illustrated in FIG. 13. All of these paths have the same optical path length.

Figure 14:
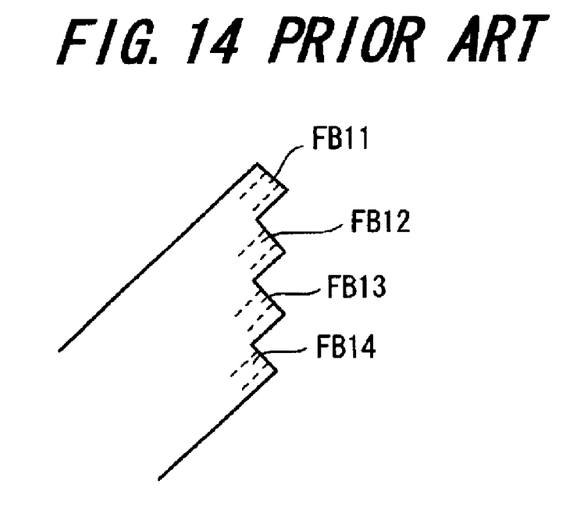
FIG. 14 is an external view showing an example of the end of a fiber array used in the photonic switch of FIG. 13.

In this example of the prior art, it is required that the fibers and lenses (not shown) be arranged in staircase-fashion, as will be understood from FIG. 13. FIG. 14 is an external view of the end of a fiber array used in the photonic switch of FIG. 13. This shows that the end face of the array must have a staircase shape. The end face of fibers is jagged and light will not emerge in a straight line under these conditions. This necessitates grinding and polishing of the surface. With the photonic switch of the prior-art example shown in FIG. 10, the end face of the fiber array can be made flat. This means that grinding and polishing is easy to perform and manufacture is easy as well. With the fiber array of FIG. 14, on the other hand, the end face has a step-like configuration. This makes grinding and polishing and, hence, manufacture difficult.

Further, with the photonic switch of FIG. 13, planar lenses cannot be applied. This switch requires that spherical or rod lenses be arranged in highly precise fashion in staircase fashion. Problems arise in terms of mounting precision and cost.

Furthermore, with the photonic switch of FIG. 13, the additional fixed mirrors are required. This leads to problems in terms of reducing size and simplifying manufacture.

SUMMARY OF THE INVENTION

Accordingly, an object of the present invention is to reduce variations in loss ascribable to differences in optical path length in a photonic switch equipped with a plurality of optical-path switching means having movable light reflecting portions.

According to the present invention, the foregoing object is attained by providing a photonic switch equipped with a plurality of optical-path switching means having movable light reflecting portions that guide light from each of a plurality of input ports to any output port among a plurality of output ports, wherein each of the optical-path switching means is made to produce a specific loss so as to reduce path-to-path variations in loss along the paths from the input to the output ports. More specifically, loss along a path is the total of loss based upon optical path length and loss produced by the optical-path switching means. It is so arranged that each of the optical-path switching means produces a specific loss so that total loss is equalized from path to path. If this arrangement is adopted, loss variation ascribable to differences in optical path length can be reduced in a photonic switch equipped with a plurality of optical-path switching means having movable light reflecting portions.

Further, if the effective area of the light reflecting portion in the optical-path switching means with respect to an incident light beam is decided in such a manner that the loss produced becomes the specific loss, then loss can be produced accurately and it is possible to reduce a variation in loss from one path to another.

Further, if the optical system is so designed that loss based upon optical path length will be minimized at a point intermediate a path of minimum length and a path of maximum length, then control width of MEMS mirror size can be reduced. This can contribute to a reduction in the size of the apparatus.

Further, two sets of input/output-port groups are provided and it is so arranged that a light beam is reflected at both surfaces of each light reflecting portion. If this expedient is adopted, two sets of photonic switches can be fabricated through a compact arrangement and it is possible to provide an optical transmission apparatus (optical cross-connect apparatus) of little loss variation in which it is possible to insert (add) and extract (drop) optical signals.

Other features and advantages of the present invention will be apparent from the following description taken in conjunction with the accompanying drawings.

Figure 1:
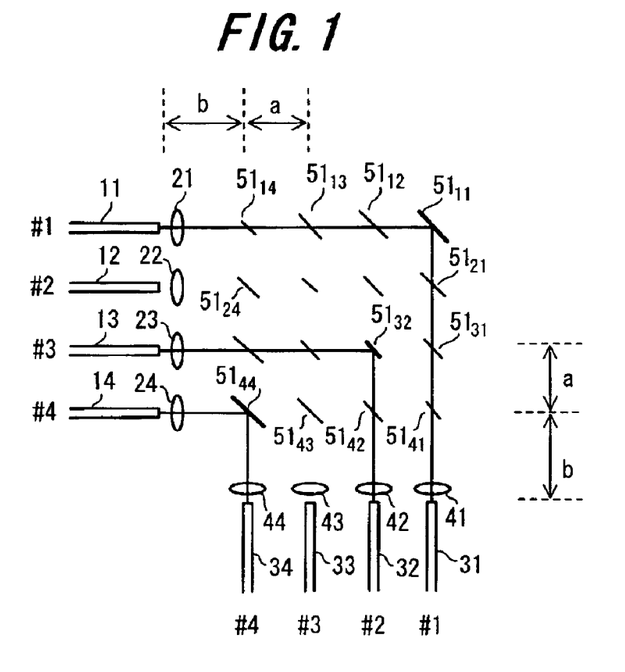
FIG. 1 is a diagram useful in describing a first principle of the present invention.

DESCRIPTION OF THE PREFERRED EMBODIMENTS (A) Principle of the Present Invention FIG. 1 is a diagram useful in describing the principle of the present invention and shows the structure of a 4-channel photonic switch. The photonic switch comprises optical fibers 11 to 14 of input ports (input channels) #1 to #4, lenses 21 to 24, optical fibers 31 to 34 of output ports (output channels) #1 to #4, lenses 41 to 44 and a plurality of micro MEMS mirrors $51_{11}$ to $51_{44}$ fabricated on a silicon substrate by a semiconductor manufacturing technique. The MEMS mirror has the structure shown in FIG. 11, by way of example.

Light that has propagated through the fibers 11 to 14 is converted by the lenses 21 to 24 to collimated light suitable for transmission through space. The MEMS mirrors $51_{11}$ to $51_{44}$ can be erected by the action of static electricity. The photonic switch is such that erecting specific mirrors causes light that has propagated through the fibers 11 to 14 to be reflected, thereby enabling the optical paths to be switched to the positions of desired fibers on the output side. The bold lines in FIG. 1 indicate MEMS mirrors that have been erected, while the fine lines indicate MEMS mirror that are in a reclining attitude. Accordingly, in FIG. 1, MEMS mirrors $51_{11}$, $51_{32}$ and $51_{44}$ are upright and, as a result, optical signals from input channels #1, #3 and #4 have been cross-connected to output channels #1, #2 and #4, respectively.

The MEMS mirrors $51_{11}$ to $51_{44}$ are adapted (provided with loss generating means) to generate specific loss in order to reduce variations in loss from path to path. In FIG. 1, the loss generating means is expressed as a difference in the size of the MEMS mirrors, with the size of the MEMS mirrors being changed in dependence upon the value of loss generated. The reason for using this notation is that the loss generated (spill-over loss) is decided based upon the effective area of a light reflecting portion with respect to an incident light beam, as will be described later. Further, the larger the spill-over loss, the smaller the effective area, and the smaller the spill-over loss, the larger the effective area.

As will be understood from FIG. 1, each path and a MEMS mirror serving as a reflecting mirror are in one-to-one correspondence. That is, a MEMS mirror that cross-connects an optical signal from input channel #i to output channel #j is $51ij$ (i=1 to 4, j=1 to 4). Here loss (spill-over loss) is generated by a MEMS mirror on each path so as to cancel out a variation in loss (referred to as "coupling loss") generated based upon the optical path length of the path, and the generated loss is adjusted in such a manner that the total loss of coupling loss and spill-over loss will be uniform from one path to another.

Figure 2:
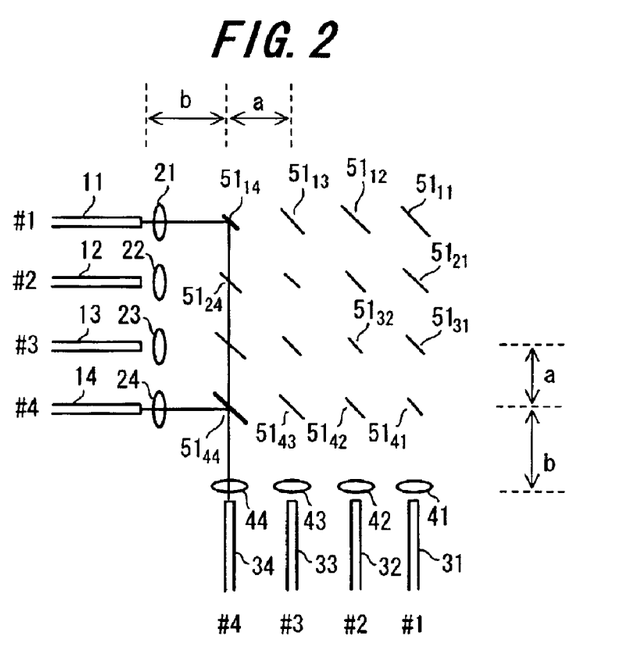
FIG. 2 is a diagram useful in describing a second principle of the present invention.

As one example, the principle of the invention will be described with regard to a case where the total loss over the shortest path (#4→#4) and the total loss over an intermediate path (#1→#4) are made equalized, as shown in FIG. 2. When the optical system is being designed, the focal lengths of the lenses and the distances between fibers and lenses on the input and output sides are decided in advance so as to minimize loss over the paths whose intermediate optical path lengths are 2b+3a (#1→#4, #2→#3, #3→#2 #4→#1), where b represents the distance between the leading end of the fiber and the MEMS mirror, and a represents the distance between mutually adjacent MEMS mirrors. If the design is such that the optical system is optimized over the intermediate optical path length, then the beam waist (the point where beam diameter is smallest) will assume a position corresponding to b+3a/2, which is half the optical path length 2b+3a.

Optical coupling efficiency $\eta(x)$ is expressed as follows using deviation x of each beam-waist position in a case where light has been input artificially from the input and output sides:

$$\eta(x) = \frac{4}{4 + \frac{\lambda^2}{\pi^2 \omega_0^4} x^2} \quad (1)$$

[For example, see Equation (3.3-30) on page 39 of Kawano "Fundamentals and Application of Optically Coupled Systems for Photonic Devices", Modern Engineering Co., 1991, where the above-mentioned equation is derived if it is assumed that $\omega_1 = \omega_2 = \omega_0$ holds in the disclosed equation.] Here $\lambda$ represents the wavelength of light and $\omega_0$ the radius of the beam waist.

In this example, the optical system is optimized using the intermediate optical path length 2b+3a as the reference and therefore x=0 holds for the intermediate optical path length of #1→#4 and x=3a holds for the shortest optical path length of #4→#4. Loss along the intermediate path is 0 dB, and loss (coupling loss) along the shortest path is $$-10 \cdot \log \eta(3a) \text{dB} \quad (2)$$

Figure 3:
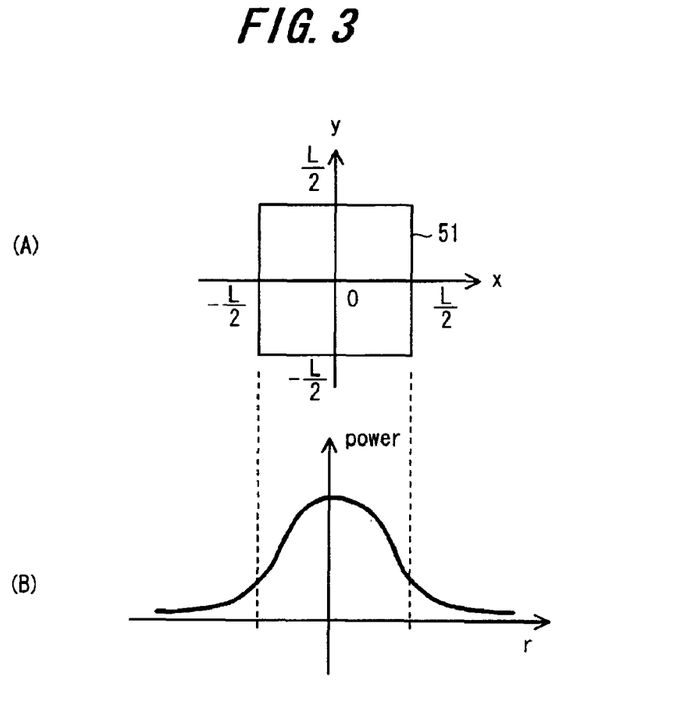
FIG. 3 is a diagram useful in describing spill-over loss.

The light beam emitted from an optical fiber can be approximated by a Gaussian shape. As shown in FIG. 3(B), the Gaussian light beam is such that light has a distribution that is theoretically infinite. When this light beam is reflected by MEMS mirror 51 of finite size, loss is produced. This loss is ascribable to the fact that the light beam spills over beyond the mirror. The relationship between the size of the MEMS mirror 51 and spill-over loss can be calculated as follows: Assume that the effective reflecting part of the MEMS mirror 51 is a square of side L as seen from the direction of beam incidence, as illustrated in (A) of FIG. 3, and that the center of the beam coincides with the center O of the mirror. In such case the optical power I(x,y) of the Gaussian beam at point (x,y) on the mirror will be as follows:

$$I(x, y) = \frac{2}{\pi \omega^2} \exp\left(-\frac{2(x^2 + y^2)}{\omega^2}\right) \quad (3)$$

where $\omega$ represents the beam radius that prevails when the optical power is 13.5% of maximum power.

Accordingly, the reflected optical power is found to be as follows by integrating the area portion of the mirror 51:

$$\kappa(L, \omega) = \int_{-\frac{L}{2}}^{\frac{L}{2}} \int_{-\frac{L}{2}}^{\frac{L}{2}} I(x, y) \, dx \, dy = \text{erf}\left(\frac{L}{\sqrt{2} \cdot \omega}\right) \quad (4)$$

where erf(z) represents an error function and is expressed as follows:

$$\text{erf}(z) = \frac{2}{\sqrt{\pi}} \int_0^z e^{-t^2} dt \quad (5)$$

The beam radius at a distance z from the position of the beam waist is represented by the following equation:

$$\omega(z) = \omega_0 \cdot \sqrt{1 + \left(\frac{\lambda z}{\pi \omega_0^2}\right)^2} \quad (6)$$

Accordingly, the beam radius at MEMS mirrors $51_{14}$, $51_{44}$ situated at positions the distance b from the fibers on the input side can be calculated as $\omega(3a/2)$ and loss (spill-over loss) due to spill-over of light from the mirrors becomes as follows:

$$-10 \cdot \log \kappa(L, \omega(\frac{3a}{2})) \quad (7)$$

Accordingly, in order to make loss over the shortest path (#4→#4) and loss over the intermediate path (#1→#4) the same, sizes L14, L44 of the mirrors $51_{14}$, $51_{44}$, respectively, should be decided so as to satisfy the following equation:

$$-10 \cdot \log \kappa(L_{14}, \omega(\frac{3a}{2})) = -10 \cdot \log \kappa(L_{44}, \omega(\frac{3a}{2})) - 10 \cdot \log \eta(3a) \quad (8)$$

where L14 and L44 represent one side of the MEMS mirrors $51_{14}$, $51_{44}$ on respective ones of the paths.

(B) First Embodiment (a) Four-Channel Photonic Switch

Figure 4:
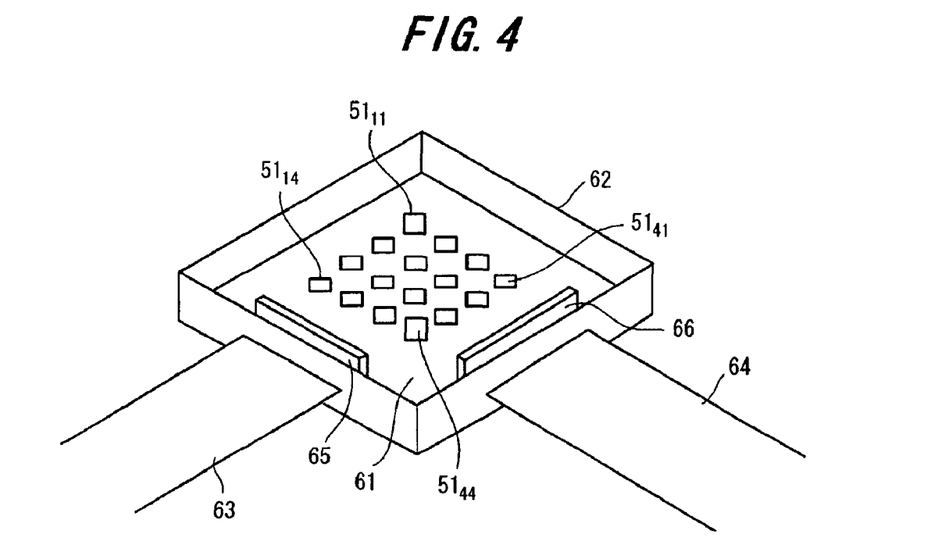
FIG. 4 is a diagram showing the structure of an embodiment of a 4-channel photonic switch according to the present invention.

FIG. 4 is a diagram showing the structure of an embodiment of a 4-channel photonic switch according to the present invention. Here all of the MEMS mirrors $51_{11}$ to $51_{44}$ are illustrated in the upright state. In this embodiment, the heights of the MEMS mirrors are varied in order to change the amount of light-beam spill-over loss for every MEMS mirror. Here the 4×4 MEMS mirrors $51_{11}$ to $51_{44}$ are fabricated on a silicon substrate 61 and are accommodated in a case 62. Though the case actually is sealed by being covered with a lid, here the case is shown with the lid removed. Optical fibers 11 to 14 and 31 to 34 (see FIG. 1) of the channels on the input side and output side, respectively, are embedded within fiber arrays 63, 64, respectively, on the input and output sides, and the ends of the arrays pass through the side walls of the case and face lens arrays 65, 66, respectively, within the case. The lens array 65 on the input side is disposed inside the case so as to oppose the end of the input-side fiber array 63 across a prescribed distance. Similarly, the lens array 66 on the input side is disposed inside the case so as to oppose the end of the output-side fiber array 64 across a prescribed distance.

As described above in section (A) relating to the principle of the invention, the focal lengths of the lenses and the distances between the fibers and the lenses are decided so as to minimize coupling loss along the intermediate distance, and the effective area (height) of the MEMS mirror $51_{ij}$ (i=1 to 4, j=1 to 4) is decided by performing a calculation similar to that indicated by Equation (8).

If the photonic switch is constructed as set forth above, losses along the respective paths is substantially equalized so that a variation in loss from one path to another is reduced.

(b) Modification

Though the shape of the effective part of the mirrors in the above embodiment is square, the mirrors may have another shape (circular, rectangular, hexagonal, etc.).

Further, the foregoing embodiment relates to a case where loss is applied to a path by altering the effective area of each mirror with respect to the incident light beam. However, the following three methods are conceivable as specific methods (means) of implementing such application of loss to a path:

The first is a-method that increases reflective loss by reducing mirror reflectivity. It is so arranged that reflectivity differs for every MEMS mirror $51_{ij}$ in accordance with the value of loss to be produced.

Figure 5:
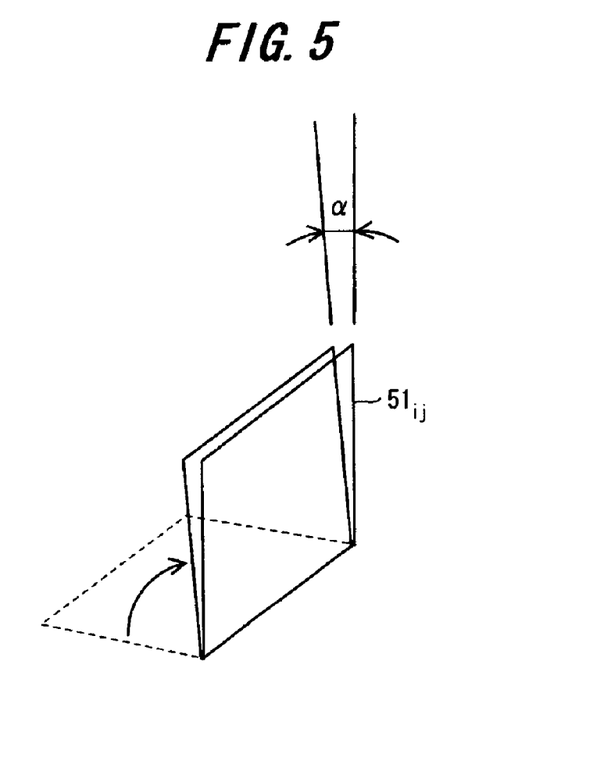
FIG. 5 is a diagram useful in describing a method of producing loss by applying an angular offset α to generate angular deviation of an optic axis.

The second method is to apply an angular offset α when each MEMS mirror $51_{ij}$ is raised, as shown in FIG. 5, thereby producing an angular deviation of the optic axis to produce excess loss. The value of the angular offset is made different for every MEMS mirror in accordance with the value of loss to be produced.

Figure 6:
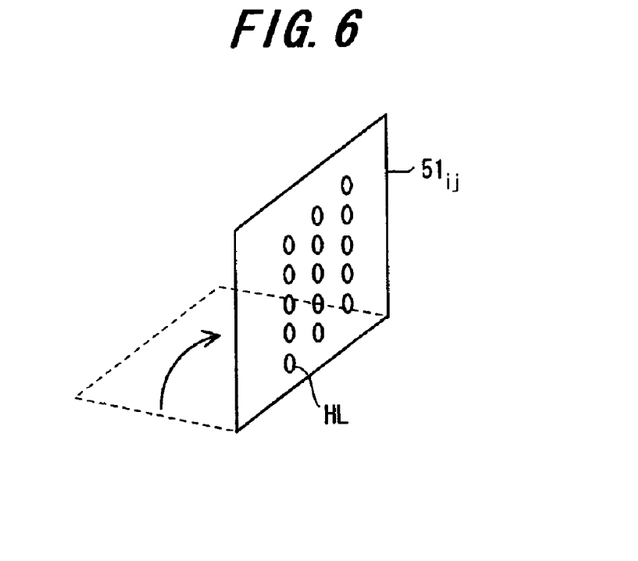
FIG. 6 is a diagram useful in describing a method of forming a pattern of minute holes in a mirror surface and changing the hole pattern for every MEMS mirror, thereby applying a specific loss.

The third method is to generate diffusion loss by roughening the reflective mirror surface of the MEMS mirror $51_{ij}$ or by providing this surface with minute holes. As shown in FIG. 6, the mirror surface is formed to have a pattern of minute holes or differences in level, and the pattern is changed for every MEMS mirror $51_{ij}$ to apply a specific loss.

(C) Second Embodiment

A numerical example will be illustrated as a second embodiment of the present invention. Though the photonic switch is not shown, a calculation will be performed based upon an example in which the photonic switch has 16 channels, the distance a between adjacent MEMS mirrors is 1 mm and the distance b between the fibers and the adjoining MEMS mirrors is 2 mm. In this case the shortest optical path length is 2b=4 mm and the longest is 2b+30a=34 mm. The optical system is designed so as to minimize loss along the channel of intermediate optical path length (2b+15a=19 mm). For example, the focal length of the lenses is 0.89 mm and the lens-to-fiber spacing is 0.93 mm.

Figure 7:
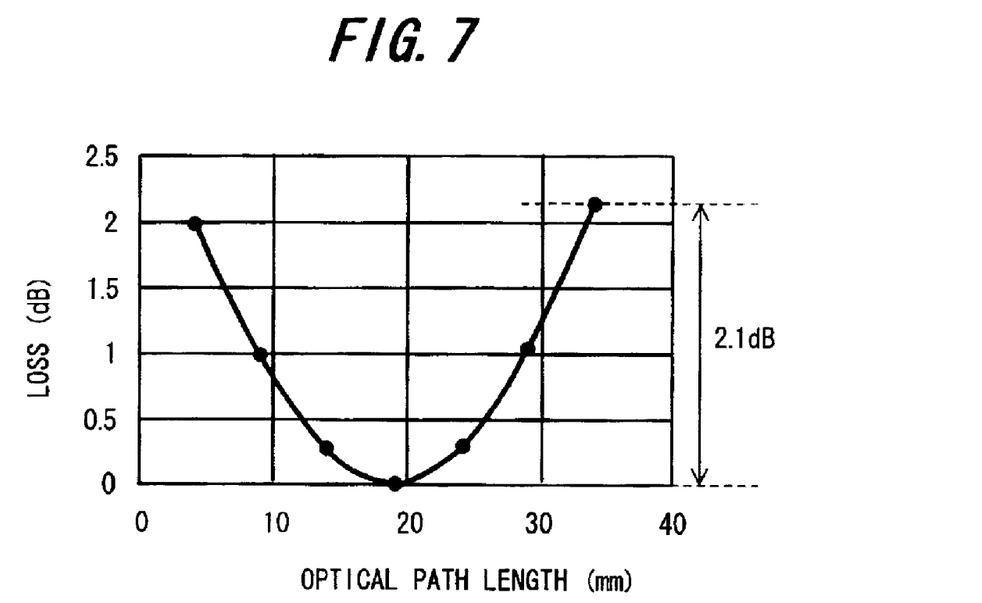
FIG. 7 is a diagram showing the relationship between optical path length and coupling loss.

If the optical system is thus designed, the total loss along each optical path length will be as shown in FIG. 7, where the maximum variation is about 2.1 dB. In FIG. 7, optical path length (mm) is plotted along the horizontal axis and loss (dB) along the vertical axis.

Figure 8:
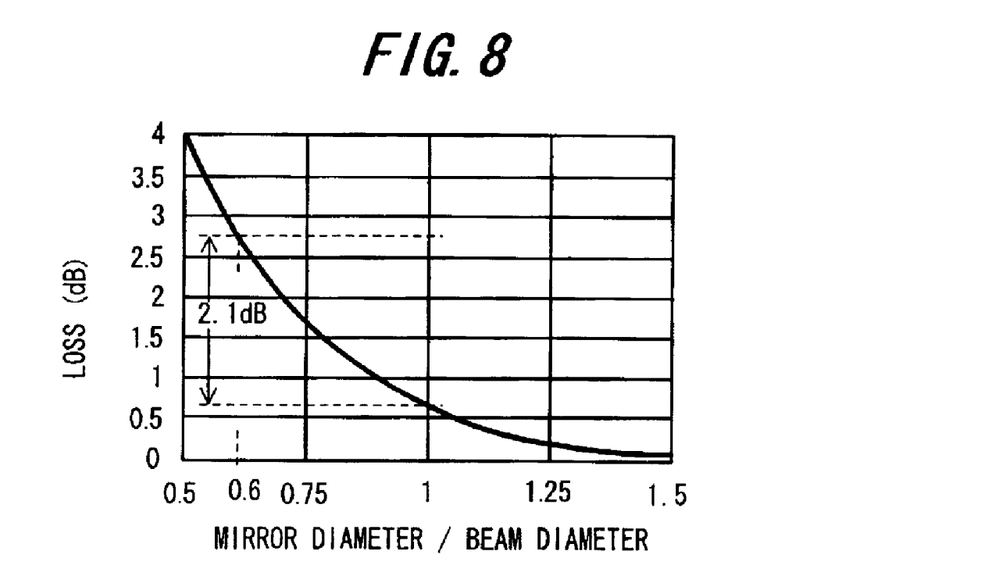
FIG. 8 showing the relationship between spill-over loss and the ratio of mirror diameter to beam diameter.

On the other hand, if the effective portion of the MEMS light reflector is made circular and loss (spill-over loss) due to spill-over of the light beam is calculated, the result will be as depicted in FIG. 8, in which the ratio of mirror diameter to beam diameter is plotted along the horizontal axis and loss (dB) along the vertical axis.

Accordingly, in order to compensate for 2.1 dB of loss due to a difference in optical path length, the diameter of the effective portion of the mirror should be changed, from one MEMS mirror to the next, within a range that is about 0.6 to 1.0 times the beam diameter. For example, if the diameter of the MEMS mirror corresponding to the path having the greatest optical path length is made 1.0 times the beam diameter, then the diameter of the MEMS mirror corresponding to the path having the intermediate length is made 0.6 times the beam diameter and the diameters of the other MEMS mirrors is varied over a range of from about 0.6 to 1.0 times the beam diameter.

(D) Third Embodiment

Figure 9:
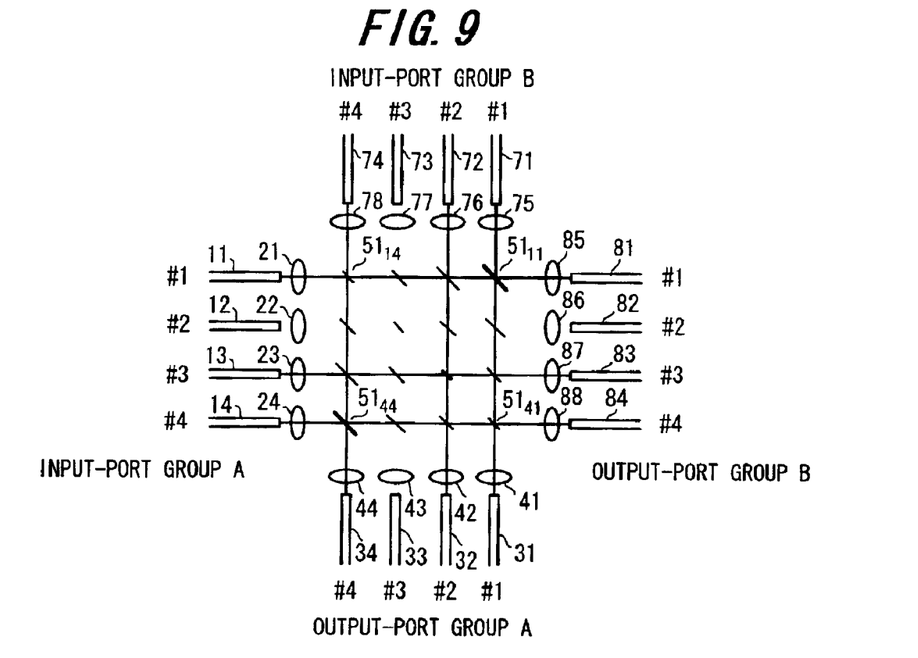
FIG. 9 is a diagram showing the structure of a third embodiment of the present invention.

FIG. 9 is a diagram showing the structure of a third embodiment of the present invention. This is an example in which two sets of 4-channel photonic switches are formed. Components identical with those shown in FIG. 1 are designated by like reference characters. This embodiment differs from the first embodiment in that (1) two sets of input ports, namely input-port groups A and B, and two sets of output ports, namely output-port groups A and B, are provided, and (2) both sides of MEMS mirror $51_{ij}$ are provided with reflecting surfaces. In other words, according to the third embodiment, in addition to the input/output-port groups A having an arrangement identical with that shown in FIG. 1, there are provided an input-port group B composed of optical fibers 71 to 74 and lenses 75 to 78, and an output-port group B composed of optical fibers 81 to 84 and lenses 85 to 88. Furthermore, reflecting surfaces are provided on both sides of the MEMS mirror $51_{ij}$.

If the effective area of the light reflecting portion formed on both sides of the MEMS mirror $51_{ij}$ with respect to the incident light beam is decided in a manner similar to that of the first embodiment, optical loss from the input-port group A to the output-port group A and optical loss from the input-port group B to the output-port group B can be made substantially the same and a variation in loss can be reduced.

In accordance with the third embodiment, two sets of photonic switches that are free of variation in loss can be constructed and, moreover, it is possible to construct an optical transmission apparatus (optical cross-connect apparatus) in which it is possible to insert (add) and extract (drop) optical signals. That is, the input-port group A and output-port group B are adopted as input/output-port groups on the side of an optical transmission line, and the input-port group B and output-port group A are adopted as input/output-port groups on the side of a tributary that adds an optical signal to the optical transmission line or drops an optical signal from the optical transmission line. In a case where the apparatus is thus used as a transmission apparatus, loss from the input-port group A to the output-port group B is minimized if the optical system is designed so as to minimize loss along the intermediate optical path length 2b+3a in a manner similar to that of the first embodiment.

Thus, in accordance with the present invention, it is possible to reduce a variation in loss, which is an important issue in regard to two-dimensional photonic switches. Further, a change in the size of MEMS mirrors can be achieved without inviting any increase in cost merely by changing a mask pattern at the time of fabrication. With regard to uniformalizing loss by applying loss, no practical problems arise because it is necessary, even in a conventional arrangement where loss variation occurs, to perform system design based upon maximum loss in terms of application to a system. A major effect obtained is that the dynamic range of other devices can be reduced owing to the reduction in loss variation.

Further, in accordance with the present invention, it is so arranged that loss in optical-path switching means is controlled by changing the effective area of a light reflecting portion with respect to the incident light beam. As a result, loss can be produced accurately and it is possible to reduce a variation in total loss from one path to another.

Further, an optical system is so designed as to minimize coupling loss along an optical path length that is intermediate paths of minimum and maximum length. As a result, control width of MEMS mirror size can be reduced. This can contribute to a reduction in the size of the apparatus.

Further, two sets of input/output port groups are provided and it is so arranged that a light beam is reflected at both surfaces of each light reflecting portion in the optical-path switching means. As a result, two sets of photonic switches can be fabricated through a compact arrangement and it is possible to provide an optical transmission apparatus (optical cross-connect apparatus) of little loss variation in which it is possible to insert (add) and extract (drop) optical signals.

As many apparently widely different embodiments of the present invention can be made without departing from the spirit and scope thereof, it is to be understood that the invention is not limited to the specific embodiments thereof except as defined in the appended claims.

What is claimed is:

1. A photonic switch comprising a plurality of optical-path switching means having movable light reflecting portions that guide light from each of a plurality of input ports to any output port among a plurality of output ports, wherein each of said optical-path switching means is made to produce a specific loss so as to reduce path-to-path variations in loss along the paths from the input to the output ports, loss along a path is the total of loss based upon optical path length and loss produced by said optical-path switching means, each of said optical-path switching means produces a specific loss so that total loss is equalized from path, and reflectivity of the light reflecting portion in said optical-path switching means is decided so that the loss produced becomes the specific loss.

2. A photonic switch comprising a plurality of optical-path switching means having movable light reflecting portions that guide light from each of a plurality of input ports to any output port among a plurality of output ports, wherein each of said optical-path switching means is made to produce a specific loss so as to reduce path-to-path variations in loss along the paths from the input to the output ports, loss along a path is the total of loss based upon optical path length and loss produced by said optical-path switching means, each of said optical-path switching means produces a specific loss so that total loss is equalized from path to path, and surface shape of the light reflecting portion in said optical-path switching means is decided so that the loss produced becomes the specific loss.

3. A photonic switch comprising a plurality of optical-path switching means having movable light reflecting portions that guide light from each of a plurality of input ports to any output port among a plurality of output ports, wherein each of said optical-path switching means is made to produce a specific loss so as to reduce path-to-path variations in loss along the paths from the input to the output ports, and each light reflecting portion has two reflecting surfaces, and two sets of input-port groups and two sets of output-port groups are provided and light beams are reflected at both surfaces of each of said light reflecting portions.

* * * * *

UNITED STATES PATENT AND TRADEMARK OFFICE
CERTIFICATE OF CORRECTION

PATENT NO. : 6,925,222 B2
DATED : August 2, 2005
INVENTOR(S) : Tamotsu Akashi et al.

It is certified that error appears in the above-identified patent and that said Letters Patent is hereby corrected as shown below:

Column 9,
Line 37, change "path" to -- path to path --.

Signed and Sealed this

Twenty-eighth Day of March, 2006

JON W. DUDAS
*Director of the United States Patent and Trademark Office*